US 6,672,775 B1

(12) United States Patent
Narayanaswami (10) Patent No.: US 6,672,775 B1
(45) Date of Patent: *Jan. 6, 2004

(54) CROSS-MACHINE WEB PAGE DOWNLOAD AND STORAGE

(75) Inventor: Chandrasekhar Narayanaswami, Wilton, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 425 days.

(21) Appl. No.: 08/904,667

(22) Filed: Aug. 1, 1997

(51) Int. Cl.⁷ ............................................... G06F 15/16
(52) U.S. Cl. ............................ 395/200.75; 395/200.75; 709/245
(58) Field of Search ................. 395/200.75, 200.32, 395/200.33, 200.36, 200.48, 200.49, 200.55, 200.57, 200.58, 200.62, 200.68; 709/245, 247, 201, 202, 203, 218, 206

(56) References Cited

U.S. PATENT DOCUMENTS

| 5,586,260 A | * | 12/1996 | Hu | 713/201 |
| 5,708,780 A | * | 1/1998 | Levergood et al. | 709/229 |
| 5,752,246 A | * | 5/1998 | Rogers et al. | 707/10 |
| 5,754,939 A | * | 5/1998 | Herz et al. | 455/3.04 |
| 5,768,528 A | * | 6/1998 | Stumm | 395/200.61 |
| 5,774,660 A | * | 6/1998 | Brendel et al. | 395/200.31 |
| 5,838,927 A | * | 11/1998 | Gillon et al. | 395/200.33 |
| 5,852,717 A | * | 12/1998 | Bhide et al. | 395/200.33 |
| 5,926,624 A | * | 7/1999 | Katz et al. | 709/217 |
| 5,944,791 A | * | 8/1999 | Scherpbier | 709/218 |
| 5,978,381 A | * | 11/1999 | Perlman et al. | 370/432 |
| 5,987,504 A | * | 11/1999 | Toga | 709/206 |
| 5,991,306 A | * | 11/1999 | Burns et al. | 370/429 |
| 6,173,322 B1 | * | 1/2001 | Hu | 709/224 |
| RE37,178 E | * | 5/2001 | Kingdon | 380/25 |

* cited by examiner

Primary Examiner—Glenton B. Burgess
Assistant Examiner—Bradley Edelman
(74) Attorney, Agent, or Firm—Casey P. August, Esq.; Perman & Green, LLP (57) ABSTRACT

A method and system is disclosed for downloading data, such as a web page, over a network such as the internet. The method includes the steps of (a) initiating a web page download request with a requesting entity having a first network address, the requesting entity being connected to the network; (b) fulfilling the web page download request with a web page source entity having a second network address; (c) transmitting a requested web page to a destination entity having a third network address; and (d) receiving and storing the requested web page in the destination entity for subsequent use by a user of the requesting entity. In this manner a low performance data processor may specify certain web pages to be downloaded to a higher performance processor over a higher bandwidth link, and may also specify postprocessing to be performed on retrieved web pages prior to a user of the first data processor accessing the stored web pages.

24 Claims, 3 Drawing Sheets

CROSS-MACHINE WEB PAGE DOWNLOAD AND STORAGE

FIELD OF THE INVENTION

This invention relates to data communications networks and, in particular, to methods and apparatus for accessing and retrieving information from a database, documents, or files maintained by a network server. The methods and apparatus of this invention are particularly useful for downloading pages from the World Wide Web (WWW).

BACKGROUND OF THE INVENTION:

An internet user may typically employ more than one device to access the WWW. For example, in an office environment a user may have access to a high performance data processor or workstation, as well as a high speed data connection, that provides access to the internet, while in other locations, such as in the home or while traveling, the user may have access only to a lower performance data processor, and a slower connection to the internet. In addition, the slower speed connection may require connect charges billed on a per minute basis.

The widespread availability of WWW phones, Personal Data Assistants (PDAs), and Windows-based CE machines with internet connectivity are expected to soon provide internet access capability to larger portions of the earth's population, thereby making efficient techniques to access WWW pages (web pages) even more desirable.

For many users an internet connection made at home may be lower in cost than a connection made while travelling, since the user may have internet service at home that allows unlimited access for a flat fee by calling a local access number.

Accessing the internet from smaller devices (e.g., WWW phones and PDAs) may be more expensive because of higher connection charges via cellular phone or non-local numbers, or due to access through hotel telecommunication facilities. In addition, the amount of local memory, disk resources, and battery power may be limited on the smaller devices. Also, when users connect with the smaller devices they are likely to be traveling, and have less time to wait for large web pages to download. Given the interactive nature of browsing, it is often difficult to return to the same page in a later browsing session, making it attractive to download the web page immediately, instead of postponing the download for a later browsing session. Finally, the smaller devices may not support all aspects of a standard known as the Hypertext Markup Language (HTML), necessitating that some documents be viewed on more powerful, and fully compliant HTML devices. For example, a portable data processor may not support a Postscript™ viewer.

At present there exist several techniques that are known to the inventor for indicating specific web pages to be downloaded at a later time. These techniques download the requested pages to the same (requesting) machine at a later time, for example at night when phone rates are lower and internet traffic is reduced.

There also exist so-called push technology schemes, such as one known as Pointcast™, that periodically download information from certain sites to a given data processor. A user can schedule, for example, news, stock, and/or weather information to be downloaded at specific times or at specific intervals. However, these techniques also download the requested information to the requesting data processor.

Other techniques, such as one known as Webwhacker™, enable a user to make a local copy of a web site, and allow the user to specify a number of links (i.e., Hyperlinks) to follow and download. However, the local copy is created on the same data processor on which the copying is scheduled.

A technology available from the assignee of this patent application, referred to as ARTour WebExpress™, allows a user to browse the web more asynchronously than is possible with current browsers. For example, using conventional WWW browsers such as Netscape Navigator™ 3.0 or Internet Explorer™ 3.0 the user can scroll a current page while a next page is being downloaded, thereby providing a degree of asynchronous access. The WebExpress™ technique takes this one level further by allowing the user to continue to specify links (Hyperlinks) to fetch while previously specified pages are being fetched. These requests are queued in a local buffer and the pages are fetched in a sequential manner. When the requested pages are available on the local machine, the user is made aware of it by a suitable signaling mechanism.

A proxy server is a World Wide Web server that acts as the sole web server for an entire domain, or for those client computers that are placed behind a firewall (i.e., a logical block between the clients and the rest of the internet). The proxy server typically resides at the firewall and intercepts all web requests originating from clients within the firewall. If a given web page request is not in the proxy server's access control list, the request is processed normally and the retrieved web page is sent back to the requesting client. If, however, the requested web page or web site is on the control list, the client instead receives a message indicating that the URL is not accessible or is not valid.

A proxy server can improve a network's performance by functioning as a caching server. Using its cached web pages, the proxy server will serve already-accessed web pages to requesting clients without requiring outside access to the internet. For example, consider a case of an environment where n client computers access the same web page, wherein each client computer outputs the address (URL) of the web page to be accessed. Without the use of the proxy server, n separate requests for the web page are initiated, and n separate copies of that same web page are retrieved and returned to the client computers.

Using a proxy server, however, the same n web page requests are handled more efficiently. Only the first request to reach the proxy server actually causes that web page to be retrieved from the WWW server, and only if that web page is not already stored in the proxy server's cache. When retrieved, the web page is sent back to the requesting client computer, and is also cached on the proxy server's hard disk. The remaining n-1 clients that request that same web page are then served instead from the proxy server's cache, thus avoiding unnecessary duplicated requests and delays.

However, none of the existing techniques that are known to the inventor enable web pages and other data to be downloaded to another machine, preferably a more powerful machine, over a different link, preferably a higher speed link.

OBJECTS AND ADVANTAGES OF THE INVENTION

It is a first object and advantage of this invention to provide an improved method and apparatus for downloading information from a server that overcomes the foregoing and other problems.

It is a second object and advantage of this invention to provide a method and system for selectively identifying links (i.e., Hyperlinks) that are to be downloaded to a second data processor for subsequent retrieval by a user of a first data processor.

SUMMARY OF THE INVENTION

The foregoing and other problems are overcome and the objects of the invention are realized by methods and apparatus in accordance with embodiments of this invention.

A method is disclosed for downloading data, such as a web page, over a network. The method includes the steps of (a) initiating a data (e.g., web page) download request with a requesting entity having a first network address, the requesting entity being connected to the network; (b) fulfilling the web page download request with a web page source entity having a second network address; (c) transmitting a requested web page to a destination entity having a third network address; and (d) receiving and storing the requested web page in the destination entity for subsequent use by a user of the requesting entity. The step of receiving and storing may include a step of transmitting a web page download acknowledgement message from the destination entity to the initiating entity for indicating a receipt of a requested web page.

One advantage of the use of the teaching of this invention is that a low performance data processor may selectively specify one or more web pages to be downloaded to a higher performance processor over a higher bandwidth communication link, and may also specify desired postprocessing to be performed on retrieved web pages prior to a user of the first data processor accessing the stored web pages.

In one embodiment the step of initiating includes steps of generating a web page download command and transmitting the web page download command to the destination entity. This may be accomplished over the network, or over another network, such as an intranet, that connects the initiating and destination entities. In this case the step of fulfilling includes initial steps of formulating, in response to receiving the web page download command at the destination entity, a network web page request message and transmitting the network web page request message from the destination entity to the web page source entity. A confirmation message may be sent to the initiating entity to confirm the receipt of the web page download command.

In another embodiment of this invention the step of initiating includes steps of generating the network web page request message that includes the third network address and transmitting the network web page request message from the initiating entity to the web page source entity. In this case the web page source entity transmits the requested web page(s) to the destination entity at the third network address.

The step of initiating includes a preliminary step of responding to a signal from a user through a user interface, such as by redefining mouse clicks when interacting with a web browser, such that the signal indicates that a specified web page is to be downloaded to and stored in the destination entity, as opposed to being fetched and displayed in a conventional manner. In this embodiment the step of responding includes a step of prompting the user to enter information for specifying at least one parameter related to downloading the web page, and/or includes a step of retrieving at least one user default parameter related to downloading the web page.

In a preferred embodiment the web page download command sent by the initiating entity includes a plurality of fields, including fields intended to specify: the first, second and third network addresses; at least one user download preference; and at least one postprocessing operation to be performed on a received web page. The at least one user download preference includes at least one of: a number of web page levels to download; whether to download graphical data; a number of permissible retries to download a web page; and an interval between the retries. The at least one postprocessing operation includes at least one of: whether to decompress a received web page; whether to virus scan a received web page; and whether to print a received web page.

The step of receiving and storing the requested web page in the destination entity includes a step of writing data into an index entry associated with the received web page. The index entry is comprised of a plurality of fields, including fields intended to specify: the first and second network addresses, and a link summary of the web page. The index entry fields further specify at least one of: a time that the web page was downloaded; a number of bytes that were downloaded; a time that the web page download command was received by the destination entity; a number of retries that were required, if any, to download the web page; and an error report.

In a preferred embodiment of this invention the method includes a capability to transmit a cancellation message from the initiating machine to the destination machine. In response to receiving a cancellation message the destination machine one of terminates an on-going web page download, or deletes an already downloaded and stored web page, as well as the index information associated with the stored web page.

In a preferred, but not limiting embodiment, the network includes the internet, and the web page source entity is a WWW server compliant with conventional and/or extended HTTP protocols.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The following description of this invention is made in the context of methods and apparatus that use a browser software entity for specifying and downloading web pages from an internet-connected server. It should be realized, however, that the teachings of this invention apply as well to accessing and retrieving other data, such as database information, documents, and files, that is available through a network-connected server. One example is in the groupware environment, such as one associated with Lotus Notes™ or Microsoft Exchanger™. Thus, those skilled in the art should appreciate that although the ensuing description is made in the context of accessing and downloading web pages, the teachings of this invention have a broader applicability to the downloading of data from a network-connected server.

Figure 1:
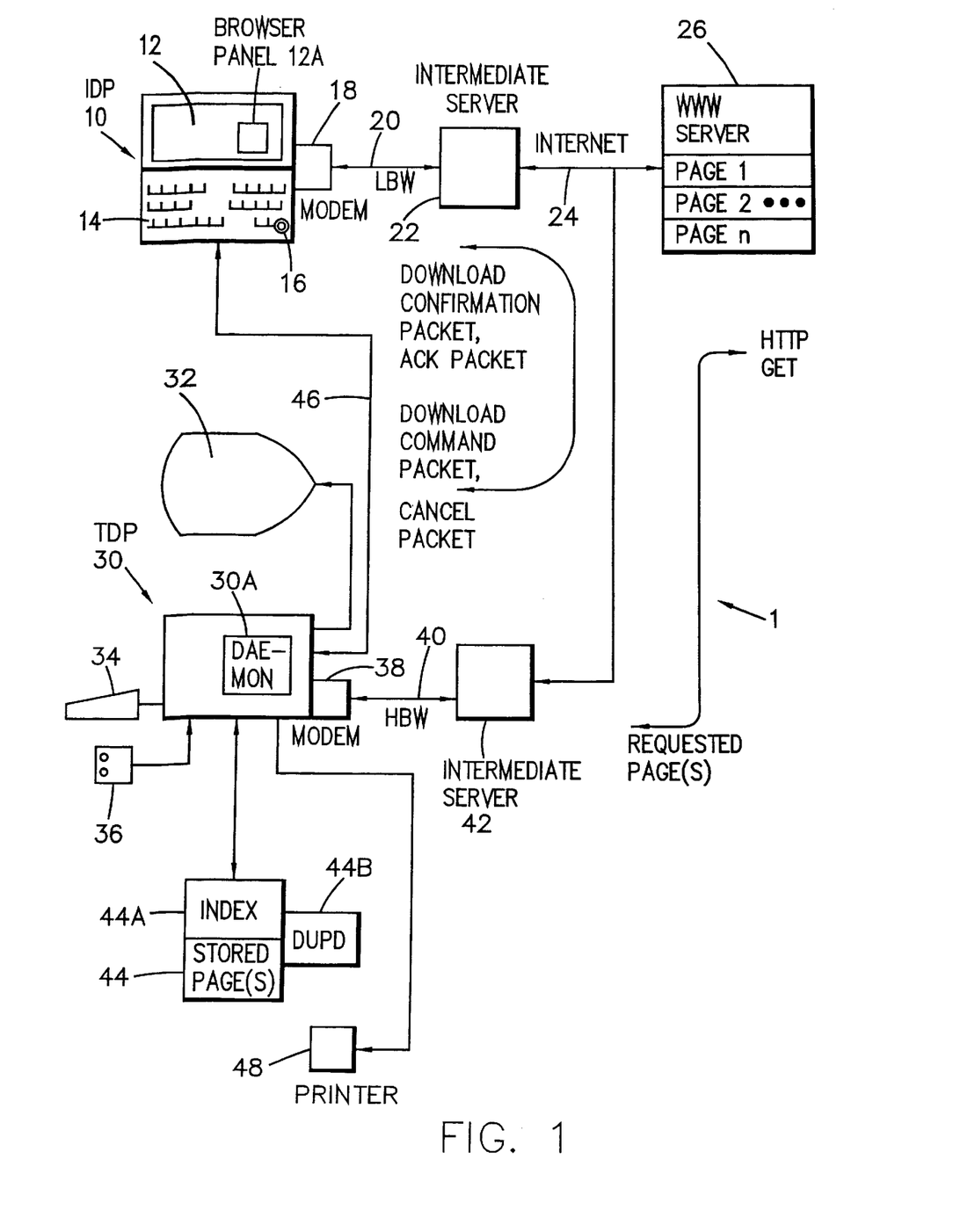
FIG. 1 is a simplified block diagram of a data communications network having an Initiating Data Processor (IDP) and a Target Data Processor (TDP) in accordance with the teaching of this invention.

Reference is made to FIG. 1 for showing a simplified block diagram of a data communications network 1 having at least one Initiating Data Processor (IDP) 10 and a Target Data Processor (TDP) 30. By example, the IDP 10 may be a laptop computer having a display 12, a keypad 14, and a pointing device 16 such as a track ball or a mouse. In other embodiments the IDP 10 may be, by example, a WWW cellular phone, a PDA, or a low performance personal computer. In any of these embodiments the IDP 10 is assumed to include a data processor (such as an embedded microcontroller) that is capable of executing the methods described below. The IDP 10 includes a modem 18 connected to a low bandwidth (LBW) line 20, e.g., 28.8 kbps, such as a dial up telephone line. The LBW line 20 may connect the IDP 10 to an intermediate server 22, such as a local access internet provider. In other embodiments the LBW line 20 may bypass the intermediate server 22. The intermediate server 22 has a high speed packet connection to the internet 24, which in turn has connected thereto a plurality of World Wide Web (WWW) servers 26 (only one of which is shown). The WWW server 26 stores one or more web pages, such as Pages 1-n. A plurality of IDPs 10 may be present in a typical environment.

The TDP 30 may be embodied in a higher performance personal computer, work station, or main frame having a display 32, keyboard 34, and a pointing device such as a track ball or a mouse 36. The TDP 30 is connected to a high bandwidth (HBW) line 40, such as a T1 line, ethernet, or token ring, through, for example, a high speed modem 38 or a direct connection. A second intermediate server 42 may provide internet access for the TDP 30, or the second intermediate server may be bypassed and not used. A printer 48, or some other hard copy device, may be provided.

In accordance with this invention, and as will be described in detail below, a user of the IDP 10 formulates a web page download command packet which is transmitted through, by example, the internet 24 to the internet address of the TDP 30. In response, the TDP 30 sends a download confirmation message back to the IDP 10, then formulates a WWW server web page request, such as a Hypertext Transfer Protocol (HTTP) GET command, and transmits the page request to the WWW server 26 identified by the previously received download command. In response, the WWW server 26 transmits the requested web page or pages back to the TDP 30 via the intermediate server 42 and the HBW line 40. The TDP 30 includes a memory 44, such as a large capacity hard drive, for storing the received web page or pages in conjunction with indexing information (Index 44A) for later retrieval and review by a user, typically, but not necessarily, the same user who earlier initiated the download command from the IDP 10. The memory 44 may also store a Default User Preference Directory (DUPD 44 B) for indicating user-specified default values, such as whether or not graphical data should be downloaded, a number of allowable retries to be attempted upon a failure to obtain a desired web page, and an interval of time between retries. Any fields in the web page download command packet that are not filled in by the user can be subsequently filled in from the information stored in the DUPD 44B. This interaction between the IDP 10, TDP 30, and WWW server 26 may be thought of as an asynchronous method for specifying and (pre)fetching web pages.

In greater detail, the user of the IDP 10 is assumed to have a connection to the WWW. The WWW browser of the IDP 10 is modified, in accordance with this invention, by remapping the pointing device (e.g., mouse) buttons. If the user desires to view a WWW page, such as while scanning a web page containing one or more Hyperlinks to other web pages, the user interacts with the WWW page in the same manner as he or she would with a standard WWW browser, such as by clicking on a desired Hyperlink. However, if the user desires to have the corresponding WWW page sent to the TDP 30, the user makes use of the remapped mouse buttons. On clicking a remapped mouse button, a user interface panel (shown as 12A in FIG. 1) is displayed by the WWW browser to enable the user to at least indicate the identity of the TDP 30 and related information. This can be accomplished by specifying the internet address of the TDP 30, the user's name, the user's web page preferences (e.g., to fetch or not fetch graphics, how many levels of links to fetch, etc.), a directory name in the memory 44 where received web pages should be stored, etc. Some of this information is optional (e.g., preferences), and user-defined default values can be used to simplify the specification process. Any such user-specified defaults may be stored in the DUPD 44B of the TDP 30 to minimize the size of the command packet that is sent to the TDP 30, thereby making efficient use of the network bandwidth. The IDP 10 may also request the TDP 30 to uncompress and/or examine received web pages by executing decompression and virus checking (and optionally repair) software. In this manner a received compressed web page can be ready for viewing by the user, and the user can be informed of any possible hazards due to the presence of a virus found in a downloaded web page. If a user identification and password is required for accessing the web page, they may also be encapsulated in the download command packet.

It should be noted that the user-specified web page identifications can be queued in the IDP 10, and the download command packet(s) sent to the TDP 30 at a later time. This mode of operation is particularly useful when the IDP 10 is not connected to the network, such as when the user is travelling on a plane and operating the IDP 10.

The following is one suitable format for the web page download command packet that is sent from the IDP 10 to TDP 30. As was described above, some fields may be optional, while others may be set to default values stored in the IDP 10 and/or the TDP 30.

---

WEB PAGE DOWNLOAD COMMAND PACKET web site network address (of WWW Server 26)
web site access information
    user id and password
TDP 30 network address
    storage location (directory) in TDP 30
IDP 10 network address
    user name
user preference block
    levels to download
    graphics y/n
    number of retries
    retry interval
    acknowledgement message bit (on/off)
postprocessing operations
    uncompress y/n
    virus checking y/n
    print y/n
    some other user-specified program execution

---

The IDP 10 transmits the web page download command packet to the TDP 30 in order to obtain one or more desired web pages. The command packet, as shown above, encodes the Uniform Resource Locator (URL) or the internet address of the web page, and also contains a location (e.g., directory on hard drive 44 ) where the web page should be stored.

Standard network protocols such as the Transmission Control Protocol/Internet Protocol (TCP/IP) may be used to transmit the command packet, or an optimized protocol between the IDP 10 and TDP 30 may be used. The optimized protocol may be compressed and encrypted. The IDP 10 may also specify, using the acknowledgement message bit, that once the TDP 30 has received the specified web page or pages the TDP 30 should notify the IDP 30 through a return acknowledgement packet. After sending the download command packet, the IDP 10 is free to return to the user for receiving a next user input.

Figure 2:
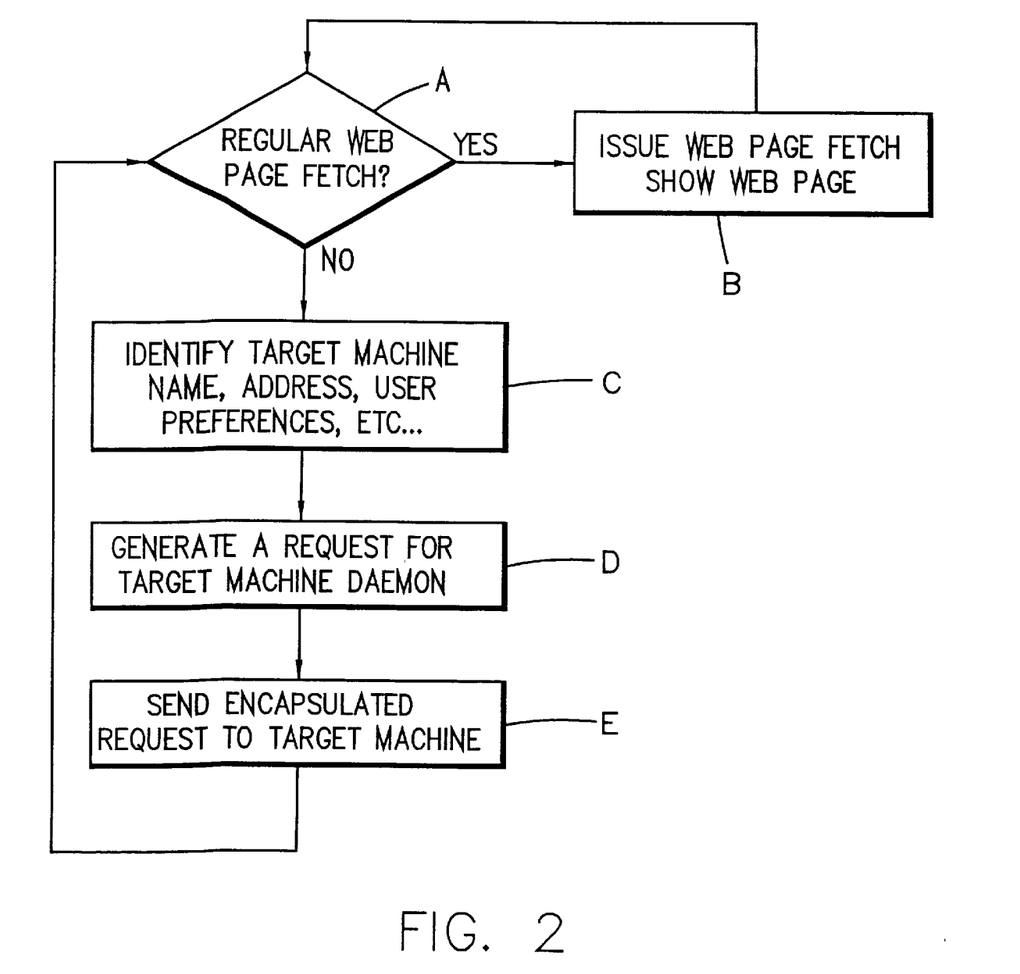
FIG. 2 is a logic flow diagram showing a method executed by the IDP of FIG. 1.

To summarize the operation of the IDP 10, and referring to the logic flow diagram of FIG. 2, at Block A the user interacts with the WWW browser of the IDP 10 to select a WWW page. If the user does not indicate that a download of the WWW page is to occur, control passes to Block B where the WWW browser issues a web page fetch and displays the web page in a conventional manner. If, however, the user clicks one of the modified (remapped) buttons, indicating that a download is required, control passes to Block C where the WWW browser displays the panel 12A wherein the user specifies the information required to formulate the web page download command, as shown above. Control then passes to Block D to generate a request for a TDP daemon 30A (a software entity on the TDP 30 that executes the download method), and then to Block E to transmit the web page download command packet to the TDP 30. Control then returns to Block A to continue web browsing.

Turning now to the operations of the TDP 30, the software daemon 30A running on the TDP 30 receives the download command packet and may send a download confirmation packet back to the IDP 10 for indicating that the download request has been received. Upon receipt of the command packet, the TDP 30 decodes the command packet and constructs the necessary HTTP requests, using the information encoded in the command packet and any required default information stored in the DUPD 44B. The TDP 30 then issues a HTTP GET or similar command to the WWW server 26 to download the specified web page or pages. If a user id and password are required to access the web page, the command packet or a DUPD 44B will contain this information. Certain user preferences, e.g., whether graphics should be fetched, are included in the HTTP GET command by either using the options specified in the command packet or the information stored in the DUPD 44A. If the web page download fails for any reason, the daemon 30A may retry for a specified number of times after a specified time interval, both of which may be specified in the command packet or in the DUPD 44A.

After the web page or pages specified in the command packet are downloaded from the WWW server 26, the web pages are stored in the directory specified in the command packet (or in a default directory identified in the DUPD 44B), and the daemon 30A updates entries in the local Index 44A of pages downloaded. The Index 44A preferably contains the time of download, the web page size, the address (e.g., URL) of the site it was downloaded from, how long the download required, and any other information that may be useful to the user. By example, the following shows a suitable format for one entry for one page (Page A) in the Index 44A.

| INDEX 44a |
|---|
| Page A |
|     address of web page (URL) |
|     link summary in web page |
|     time of fetch |
|     number of bytes fetched |
|     address of IDP 10 |
|     time of initiation (time command packet was received) |
|     number of retries required |
|     error report |
| Page B .... |

If an acknowledgement message was requested upon completion of the web page receipt at the TDP 30, the acknowledgement packet is sent at this time. Any specified postprocessing of the received web pages (such as scanning for viruses, decompression, printing, etc.) is also performed, if specified in the previously received command packet or the user preferences in the DUPD 44B.

After all specified levels of pages have been received, i.e., the command packet has been processed completely, the daemon 30A goes to standby to wait for the receipt of a next command packet from the IDP 10.

When the same or a different user arrives at the TDP 30, the Index 44A provides an efficient way to access and view web pages that were previously downloaded and stored in the memory 44. The user may also transfer a stored web page to a memory in the IDP 10, or some other data processor, using a direct wired or wireless (e.g., IR link) computer-to-computer link, or with some removable media such as disk.

Figure 3:
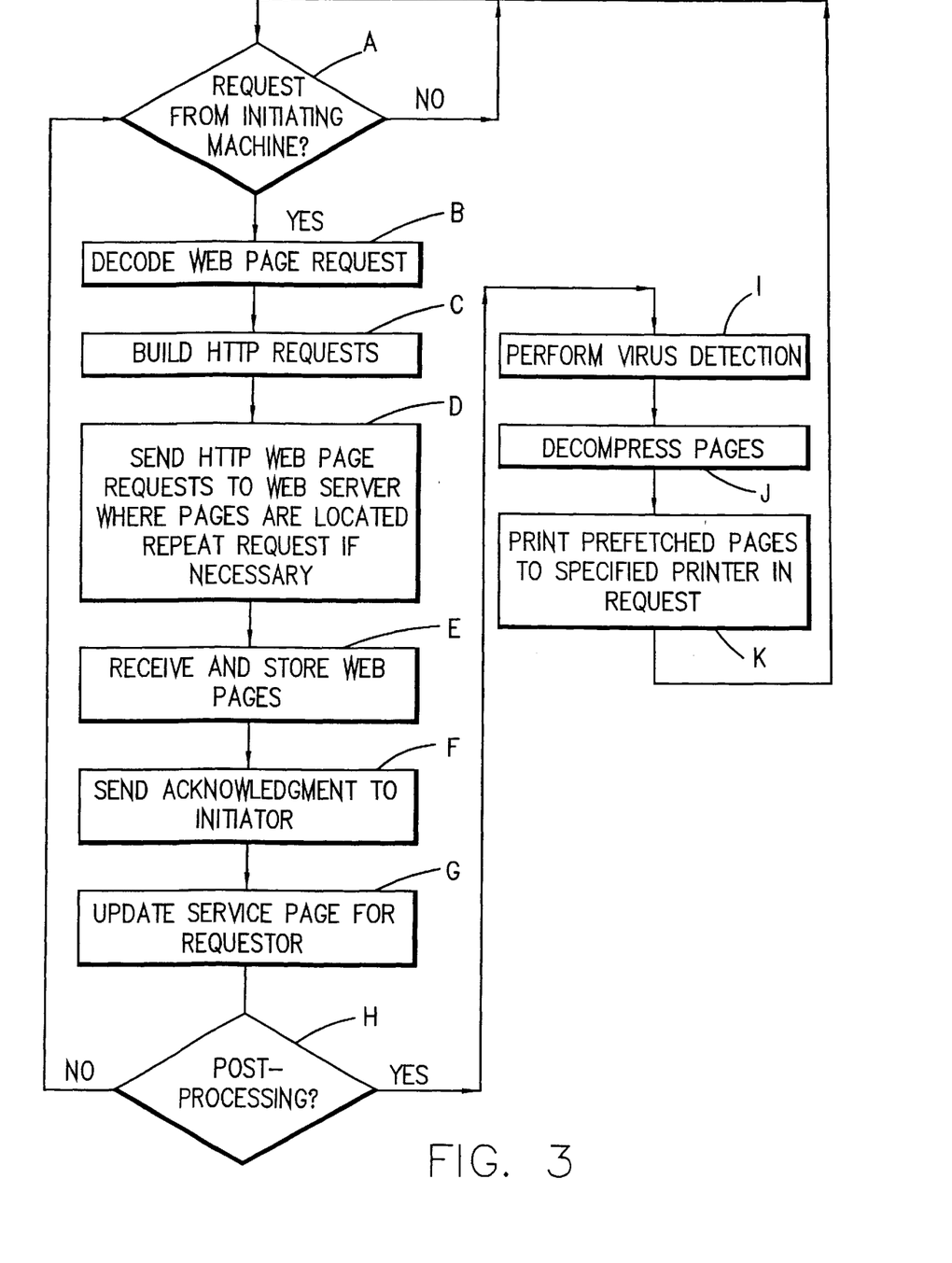
FIG. 3 is a logic flow diagram showing a method executed by the TDP of FIG. 1.

In summary, reference is made to the logic flow diagram of FIG. 3 for illustrating the method performed by the daemon 30A. At Block A the daemon A is in a standby state waiting for a command packet from the IDP 10. When a command packet is received, control passes to Block B where the daemon 30A decodes the web page request. The download confirmation packet, which acknowledges receipt of the downloaded command packet, is also transmitted back to the IDP 10. Control then passes to Block C to build the necessary HTTP request, and then to Block D to send the HTTP web page request to the web server 26 where the desired page or pages are located. If necessary, the request is repeated up to the maximum specified number of retries. Assuming that the requested web page is available, the web page or pages are received at Block E and stored in the specified directory in the memory 44. If desired, the daemon 30A sends an acknowledgment packet back to the IDP 10 at Block F to indicate that it has received the web page or pages. Control then passes to Block G to update the service page in the Index 44A, as shown above, and then to Block H to determine if postprocessing of the received web page or pages were requested. If no, control returns to Block A and the daemon 30A re-enters the standby state. If postprocessing was requested, control passes to at least one of Blocks I, J, K to perform virus detection, decompress any compressed web pages, and/or to print downloaded web pages to the printer 48 specified in the command packet or the DUPD 44B. Control then returns to Block A to re-enter the standby state.

While the invention has been described in the context of two or more data processors having different capabilities, the teachings of this invention apply as well to two or more data processors having the same capabilities and similar performance characteristics.

Also, the command packet mechanism may be implemented by visiting a web page on the TDP 30 from the IDP 10, and invoking a suitable program there. In this case the functionality of the browser panel 12A is incorporated into the program running on the TDP 30, and desired web pages and other information are specified by the user of the IDP 10 to the program running on the TDP 30.

In a preferred embodiment, the user of the IDP 10 may also cancel earlier made requests. The user of the IDP 10 may also cancel a web page download request that is in progress, and thus delete any data already fetched. Any completed requests may be canceled by sending a cancellation request packet to the TDP 30, requesting that the TDP 30 delete stored web page(s) and the associated information from the Index 30. This operation can be facilitated by the TDP 30 assigning a transaction id or some identifier to a received command packet, and including the transaction id when responding with the download confirmation packet. The IDP 10 may then simply include the transaction id in the cancellation packet for specifying one of possibly several previously sent web page download command packets.

Also, it is within the scope of the teaching of this invention to employ a separate connection, such as an intranet connection 46, between the IDP 10 and the TDP 30 for transferring the command packet and the confirmation packet, as well as the optional acknowledgement and cancellation packets, between these processors. In this manner the IDP 10 may also access and retrieve any stored web pages from the memory 44, as the connection 46 will typically have a higher bandwidth than the LBW line 20, enabling a retrieved web page to be received and stored in an efficient manner.

It is also within the scope of this invention to provide a modification to existing HTTP protocols such that a requesting device (e.g., the IDP 10) includes, with the source address in the request for a web page, a different destination address for the web page. In this manner the IDP 10 sends, by example, a modified HTTP GET command to the WWW server 26 which, in turn, sends a requested web page to the TDP 30 for storage and possible postprocessing.

This embodiment assumes that the TDP 30 receives some type of an identification (e.g., the internet address) of the IDP 10 with the returned web page(s). Also, it is preferred that the daemon of the TDP 30 accept received web pages only for trusted (e.g., pre-authorized) IDPs 10.

Thus, while the invention has been particularly shown and described with respect to preferred embodiments thereof, it will be understood by those skilled in the art that changes in form and details may be made therein without departing from the scope and spirit of the invention.

What is claimed is:

1. A method to download data from a server over a network, comprising the steps of:

initiating a data download request with a requesting entity having a first network address, the requesting entity having an interface for connecting to the network over a first communication link;

sending the data download request to a destination entity where the request is first verified for authenticity and then modified by the destination entity to include a third network address of the destination entity;

forwarding the modified data download request to a data server;

fulfilling the data download request with the data server entity having a second network address;

transmitting, over a second communication link, the requested data to the destination entity having the third network address; and testing authorization for receiving said requested data and receiving and storing the requested data in the destination entity for subsequent access by any authorized user if said authorization passes, wherein the requesting entity is different from the destination entity, and wherein the requested data is transmitted from the data server entity to the destination entity without transmitting the requested data from the data server entity or a source entity to the requesting entity.

2. A method as in claim 1, wherein the data is comprised of a web page, and wherein step of initiating includes steps of:

generating a web page download command; and transmitting the web page download command to the destination entity; and wherein the step of fulfilling includes initial steps of, formulating, in response to receiving the web page download command at the destination entity, a network web page request message; and transmitting the network web page request message from the destination entity to the web page server entity, wherein the web page download command is transmitted over the network.

3. A method as in claim 2, wherein the web page download command is transmitted over a second network separate from the network.

4. A method as in claim 2, wherein the step of formulating includes a preliminary step of transmitting a web page download confirmation message from the destination entity to the requesting entity for indicating a receipt of the web page download command.

5. A method as in claim 2, wherein the web page download command is comprised of a plurality of fields, including fields for specifying:

the first, second and third network addresses;

at least one user download preference; and at least one postprocessing operation to be performed on a received web page.

6. A method as in claim 2, and further comprising steps of:

transmitting a cancellation message from the requesting entity to the destination entity;

receiving the cancellation message; and in response, terminating an on-going web page download or deleting an already downloaded and stored web page.

7. A method as in claim 5, wherein the at least one user download preference includes at least one of:

a number of web page levels to download;

whether to download graphical data;

a number of retries to download a web page; and an interval between retries.

8. A method as in claim 8, wherein the at least one postprocessing operation includes at least one of:

whether to decompress a received web page;

whether to virus scan a received web page; and whether to print a received web page.

9. A method as in claim 1, wherein the data is comprised of a web page, and wherein the step of initiating includes steps of:

generating a network web page request message that includes the third network address; and transmitting the network web page request message from the requesting entity to the destination entity.

10. A method as in claim 1, wherein the data is comprised of a web page, and wherein the step of receiving and storing includes a step of transmitting a web page download acknowledgement message from the destination entity to the entity for indicating a receipt of a requested web page.

11. A method as in claim 1, wherein the data is comprised of a web page, and wherein the step of initiating includes a preliminary step of responding to a signal from a user through a user interface, the signal indicating that a specified web page is to be downloaded to and stored in the destination entity.

12. A method as in claim 11, wherein the step of responding includes a step of prompting the user to enter information for specifying at least one parameter related to downloading the web page.

13. A method as in claim 11, wherein the step of responding includes a step of retrieving at least one user default parameter related to downloading the web page.

14. A method as in claim 1, wherein the data is comprised of a web page, and wherein the step of receiving and storing the requested web page in the destination entity includes a step of writing data into an index entry associated with the received web page.

15. A method as in claim 14, wherein the index entry is comprised of a plurality of fields, including fields for specifying:
   the first and second network addresses; and
   a link summary of the web page.

16. A method as in claim 15, wherein the fields further specify at least one of:
   a time that the web page was downloaded;
   a number of bytes that were downloaded;
   a time that the web page download command was received by the destination entity;
   a number of retries that were required, if any, to download the web page; and
   an error report.

17. A method as in claim 1, wherein the network includes the internet, and wherein the server entity is comprised of a WWW server.

18. A method as in claim 1, wherein the data download request comprises information identifying the third network address.

19. A method as in claim 18, further comprising a user inputting the information identifying the third network address into the data download request.

20. A method as in claim 19, wherein the step of inputting comprises selecting the information identifying the third network address from a default network address, wherein the user can change the third network address to a different address other than the default network address.

21. A method as in claim 1, wherein the step of initiating a data download request with a requesting entity having a first network address further comprises the steps of:
   pre-mapping at least one function key of a World Wide Web (WWW) browser such that a predetermined user panel is displayed when the at least one function key is selected;
   identifying within the predetermined user panel at least one WWW web page to be downloaded; and
   identifying within the predetermined user panel the destination entity to which the at least one WWW web page is to be down loaded.

22. A method as in claim 21, wherein the step of identifying within the predetermined user panel the destination entity to which the at least one WWW web page is to be down loaded further comprises the step of identifying within the predetermined user panel authorized users allowed to access the downloaded data.

23. A method as in claim 21, wherein the step of identifying within the predetermined user panel the destination entity to which the at least one WWW web page is to be down loaded further comprises the step of identifying within the predetermined user panel a user identifier to be matched against a user authorization list held by the destination entity, wherein the user authorization list is used to determine if the user is authorized to request data downloads to the destination entity.

24. A method as in claim 1, wherein the step of sending the data download request to the destination entity further comprises the step of encrypting the data download request.

* * * * *

UNITED STATES PATENT AND TRADEMARK OFFICE
CERTIFICATE OF CORRECTION

PATENT NO. : 6,672,775 B1
DATED : January 6, 2004
INVENTOR(S) : Narayanaswami

It is certified that error appears in the above-identified patent and that said Letters Patent is hereby corrected as shown below:

Column 10,
Line 55, between "claim" and "wherein" please replace "8" with -- 1 --

Column 11,
Lines 4 and 5, between "the" and "entity" please insert -- requesting --

Signed and Sealed this

Twenty-eighth Day of September, 2004

JON W. DUDAS
*Director of the United States Patent and Trademark Office*